(12) United States Patent
Voigt et al.

(10) Patent No.: US 10,926,214 B2
(45) Date of Patent: Feb. 23, 2021

(54) HOLLOW FIBER MEMBRANE FOR USE IN AN ANESTHETIC CIRCUIT

(71) Applicants: 3M INNOVATIVE PROPERTIES COMPANY, St. Paul, MN (US); DMF MEDICAL INCORPORATED, Halifax (CA)

(72) Inventors: Ina Voigt, Neuss (DE); Wolfgang Ansorge, Neuss (DE); Florentin Wilfart, Halifax (CA); Michael Schmidt, Halifax (CA); Jan Haelssig, Halifax (CA)

(73) Assignee: 3M Innovative Properties Company, St. Paul, MN (US)

( * ) Notice: Subject to any disclaimer, the term of this patent is extended or adjusted under 35 U.S.C. 154(b) by 127 days.

(21) Appl. No.: 16/094,833

(22) PCT Filed: Apr. 20, 2017

(86) PCT No.: PCT/US2017/028525
§ 371 (c)(1),
(2) Date: Oct. 18, 2018

(87) PCT Pub. No.: WO2017/184817
PCT Pub. Date: Oct. 26, 2017

(65) Prior Publication Data
US 2019/0091626 A1 Mar. 28, 2019

(30) Foreign Application Priority Data
Apr. 21, 2016 (EP) .................................. 16166434

(51) Int. Cl.
*B01D 53/22* (2006.01)
*B01D 71/26* (2006.01)
(Continued)

(52) U.S. Cl.
CPC ........... *B01D 53/228* (2013.01); *B01D 53/22* (2013.01); *B01D 69/02* (2013.01); *B01D 69/08* (2013.01);
(Continued)

(58) Field of Classification Search
CPC ...... B01D 53/22; B01D 53/228; B01D 69/08; B01D 69/087; B01D 69/12; B01D 71/26;
(Continued)

(56) References Cited

U.S. PATENT DOCUMENTS 4,519,909 A 5/1985 Castro
4,564,488 A 1/1986 Gerlach
(Continued)

FOREIGN PATENT DOCUMENTS

CN 104707490 6/2015
EP 0299381 6/1999
(Continued)

OTHER PUBLICATIONS

Bengtson, "Comparison of Costs of Different Anaesthetic Techniques", *Acta Anaesthesiol Scand*, 1988, vol. 32, No. 1, pp. 33-35.
(Continued)

*Primary Examiner* — Jason M Greene
(74) *Attorney, Agent, or Firm* — Scott A. Baum (57) ABSTRACT

Hydrophobic poly(4-methyl-1-pentene) hollow fiber membrane for retention of anesthetic agents with an inner and an outer surface and between inner and outer surface an essentially isotropic support layer with a sponge-like, open-pored, microporous structure free of macrovoids and adjacent to this support layer on the outer surface a dense separation layer with a thickness between 1.0 and 3.5 μm. The membrane has a porosity in the range of greater than 35% to less than 50% by volume and a permeance for $CO_2$ of 20-60 mol/(h·m²·bar), a gas separation factor $\alpha(CO_2/N_2)$ of at least
(Continued)

5 and a selectivity $CO_2$/anesthetic agents of at least 150. The process for producing this membrane is based on a thermally induced phase separation process in which process a homogeneous solution of a poly(4-methyl-1-pentene) in a solvent system containing components A and B is formed, wherein component A is a strong solvent and component B a weak non-solvent for the polymer component. After formation of a hollow fiber the hollow fiber is cooled in a liquid cooling medium to form a hollow fiber membrane. The concentration of the polymer component in the solution may be in the range from 42.5 to 45.8 wt.-% and the hollow fiber leaving the die runs through a gap between die and cooling medium with a gap length in the range of 5-30 mm.

4 Claims, 3 Drawing Sheets

(51) Int. Cl.
 B01D 69/08 (2006.01)
 B01D 69/02 (2006.01)
(52) U.S. Cl.
 CPC ........... B01D 69/087 (2013.01); B01D 71/26 (2013.01); B01D 2053/224 (2013.01); B01D 2256/10 (2013.01); B01D 2257/504 (2013.01); B01D 2259/4533 (2013.01); B01D 2325/022 (2013.01); B01D 2325/023 (2013.01); B01D 2325/04 (2013.01); B01D 2325/20 (2013.01); B01D 2325/38 (2013.01); Y02C 20/40 (2020.08)
(58) Field of Classification Search
 CPC ........ B01D 2325/022; B01D 2325/023; B01D 2325/38; B01D 2259/4533; A61M 16/0093; A61M 16/104
 See application file for complete search history.

(56) References Cited

U.S. PATENT DOCUMENTS

| 4,666,607 | A | 5/1987 | Josefiak | |
|---|---|---|---|---|
| 5,102,432 | A | 4/1992 | Prasad | |
| 6,375,876 | B1 | 4/2002 | Kessler | |
| 6,409,921 | B1 | 6/2002 | Muller | |
| 6,497,752 | B1* | 12/2002 | Kessler | B01D 71/26 96/14 |
| 7,429,343 | B2 | 9/2008 | Kessler | |
| 2005/0145107 | A1* | 7/2005 | Kessler | B01D 71/26 95/45 |

FOREIGN PATENT DOCUMENTS

| WO | 2003-061812 | 7/2003 |
|---|---|---|
| WO | 2012-174649 | 12/2012 |
| WO | 2014-094139 | 6/2014 |

OTHER PUBLICATIONS

Bito, "Degradation Products of Sevoflurane During Low-Flow Anaesthesia", British Journal of Anaesthesia, Jan. 1995, vol. 74, No. 1, pp. 56-59.
Bouche, "Quantitative Determination of Vapor-Phase Compound A in Sevoflurane Anesthesia Using Gas Chromatography-Mass Spectrometry", Clinical Chemistry, Feb. 2001, vol. 47, No. 2, pp. 281-291.
Chapanian, "Flow Rate Measurement Errors in Vacuum Tubes: Effect of Gas Resistance to Accumulation", The Canadian Journal of Chemical Engineering, Aug. 2008, vol. 86, No. 4, pp. 711-718.
Comans, "The Increase in Healthcare Costs Associated with Frailty in Older People Discharged to A Post-Acute Transition Care Program", Age and Ageing, Jan. 2016, vol. 45, pp. 317-320.
Cotter, "Low-Flow Anaesthesia; Practice, Cost Implications and Acceptability", Anaesthesia, 1991, vol. 46, No. 12, pp. 1009-1012.
Cunningham, "Sevoflurane Degradation to Compound A in Anaesthesia Breathing Systems", British Journal of Anaesthesia, Oct. 1996, vol. 77, No. 4, pp. 537-543.
Czichos, "Permeation and Diffusion", Springer Handbook of Materials Measurement Methods, 2006, pp. 371-397.
Feiss, "Anesthetic Gas and Vapor Saving with Minimal Flow Anesthesia", Acta Anaesthesiologica Belgica, Jan. 1990, vol. 41, No. 3, pp. 249-251.
Feldman, "Managing Fresh Gas Flow to Reduce Environmental Contamination", Anesthesia and Analgesia, May 2012, vol. 114, No. 5, pp. 1093-1101.
"Forane (isoflurane, USP)", Baxter Healthcare Corporation, (Jul. 2006)10 pages.
Graham, "LV On the Absorption and Dialytic Separation of Gases by Colloid Septa", The London, Edinburgh, and Dublin Philosophical Magazine and Journal of Science, Series 4, Dec. 1866, vol. 32, No. 218, pp. 401-420.
Ishizawa, "General Anesthetic Gases and The Global Environment", Anesthesia and Analgesia, Jan. 2011, vol. 112, No. 1, pp. 213-217.
Keijzer, "Compound A and Carbon Monoxide Production from Sevoflurane and Seven Different Types of Carbon Dioxide Absorbent in A Patient Model", Acta Anaesthesiol Scand, 2007, vol. 51, No. 12, pp. 31-37.
Kesting, "The Thermal Process", Synthetic Polymeric Membranes,1985, pp. 261-264.
Kharasch, "Influence of Sevoflurane on The Metabolism and Renal Effects of Compound A in Rats", Anesthesiology, Dec. 2005, vol. 103, No. 6, pp. 1183-1188.
Kruczek, "Analytical Solution for The Effective Time Lag of a Membrane in A Permeate Tube Collector in Which Knudsen Flow Regime Exists", Journal of Membrane. Science, Apr. 2005, vol. 256, No. 1, pp. 57-63.
Kruczek, "Challenges in Microflow Measurements", Flow Measurement, 2012, 36 pages.
Kruczek, "Effect of a Resistance-Free Tank on The Resistance to Gas Transport in High Vacuum Tube", Journal of Membrane Science, Sep. 2006, vol. 280, No. 1-2, pp. 29-36.
Leung, "Preoperative Frailty in Older Surgical Patients Is Associated with Early Postoperative Delirium", Anesthesia and Analgesia, May 2011, vol. 112, No. 5, pp. 1199-1201.
Li, "Degradation Products of Different Water Content Sevoflurane in Carbon Dioxide Absorbents by Gas Chromatography-Mass Spectrometry Analysis", Chinese Medical Journal (English), Apr. 2011, vol. 124, No. 7, pp. 1050-1054.
Li, Review of CO2 Absorption Using Chemical Solvents in Hollow Fiber Membrane Contactors, Separation and Purification Technology, Feb. 2005, vol. 41, No. 2, pp. 109-122.
Lubitz, 'Health, Life Expectancy, and Health Care Spending Among the Elderly', The New England Journal of Medicine, Sep. 2003, vol. 349, No. 11, pp. 1048-1055.
Marini, "Compound A, Formaldehyde and Methanol Concentrations During Low-Flow Sevoflurane Anaesthesia: Comparison of Three Carbon Dioxide Absorbers", Acta Anaesthesiol Scand, May 2007, vol. 51, No. 5, pp. 625-632.
Mauviel, "Dense Membrane Permeation: From the Limitations of The Permeability Concept Back to The Solution-Diffusion Model", Journal of Membrane Science, 2005, vol. 266, pp. 62-67.
Meadows, "Promoting Safe and Effective Drugs for 100 Years", FDA Consumer Magazine, The Centennial Edition/Jan.-Feb. 2006, 8 pages.
Morisato, "Polymer Characterization And Gas Permeability of Poly(1-trimethylsilyl-1-propyne) [PTMSP], poly(1-phenyl-1-propyne) [PPP], and PTMSP/PPP Blends", Journal of Polymer Science: Part B: Polymer Physics, 1996, vol. 34, pp. 2209-2222.
Morisato, "Synthesis and Gas Permeation Properties of Poly(4-methyl-2-pentyne)", Journal of Membrane Science, 1996, vol. 121, pp. 243-250.

(56) References Cited

OTHER PUBLICATIONS

Pinnau, "Transport of Organic Vapors Through Poly(1-trimethylsilyl-1-propyne)", *Journal of Membrane Science*, 1996, vol. 116, pp. 199-209.
Prasser, "Elimination of Sevoflurane is Reduced in Plasma-Tight Compared to Conventional Membrane Oxygenators", *European Journal of Anaesthesiology*, Mar. 2008, vol. 25, No. 2, pp. 152-157.
Robeson, "Correlation of Separation Factor Versus Permeability for Polymeric Membranes", *Journal of Membrane Science*, 1991, vol. 62, pp. 165-185.
Robeson, "Polymer Membranes for Gas Separation", *Current Opinion in Solid State and Materials Science*, 1999, vol. 4, pp. 549-552.
Robeson, "The Upper Bound Revisited", *Journal of Membrane Science*, 2008, vol. 320, pp. 390-400.
Rowe, Influence of Temperature on The Upper Bound: Theoretical Considerations and Comparisons with Experimental Results, *Journal of Membrane Science*, 2010, vol. 360, pp. 58-69.
Ryan, "Global Warming Potential of Inhaled Anesthetics: Application to Clinical Use", *Anesthesia and Analgesia*, Jul. 2010, vol. 111, No. 1, pp. 92-98.
Sakai, "Inhalation Anesthesiology and Volatile Liquid Anesthetics: Focus on Isoflurane, Desflurane, and Sevoflurane", *Pharmacotherapy*, 2005, vol. 25, No. 12, pp. 1773-1788.
Smolders, "Liquid-Liquid Phase Separation in Concentrated Solutions of Non-Crystallizable Polymers by Spinodal Decomposition", *Kolloid-Z. u Z. Polymere*, 1971, vol. 243, pp. 14-20.
Stabernack, "Sevoflurane Degradation by Carbon Dioxide Absorbents May Produce More Than One Nephrotoxic Compound in Rats", *Canadian Journal of Anesthesia*, Jan. 2003, vol. 50, No. 3, pp. 249-252.

"Suprane (Desflurane, USP)", *Baxter Healthcare Corporation*, 21 pages.
Toy, "Pure-Gas and Vapor Permeation and Sorption Properties of Poly[1-Phenyl-2-[p-(trimethylsilyl)phenyl]acetylene] (PTMSDPA)", *Macromolecules*, 2000, vol. 33, pp. 2516-2524.
Turner, "The Effect of Living Alone on the Costs and Benefits of Surgery Amongst Older People" *Social Science & Medicine*, 2016, vol. 150, pp. 95-103.
Turrentine, "Surgical Risk Factors, Morbidity, and Mortality in Elderly Patients", *Journal of American College of Surgeons*, Dec. 2006, vol. 203, No. 6, pp. 865-877.
Wiesenack, "In Vivo Uptake and Elimination of Isoflurane by Different Membrane Oxygenators During, Cardiopulmonary Bypass", *Anesthesiology*, Jul. 2002, vol. 97, No. 1, pp. 133-138.
Wijmans, "The Solution-Diffusion Model: A Review", *Journal of Membrane Science*, 1995, vol. 107, pp. 1-21.
Wilfart, "Characterization of Dense PMP Membranes for The Separation of Carbon Dioxide from Anaesthetic Vapours In Low Pressure Applications," *Membrane Characterization, Pending submission to the Journal of Membrane Science*, 22 pages.
Wilfart, "Delivery of Vapors on Cardiopulmonary Bypass using Different Oxygenator Membranes", *Proceedings of the IASTED International Conference on Biomedical Engineering*, Feb. 2011, pp. 265-270.
Yampolskii, "Polymeric Gas Separation Membranes", *Macromolecules*, 2012, vol. 45, pp. 3298-3311.
International Search Report for PCT International Application No. PCT/US2017/028525, dated Jul. 27, 2017, 5 pages.

* cited by examiner

HOLLOW FIBER MEMBRANE FOR USE IN AN ANESTHETIC CIRCUIT

CROSS REFERENCE TO RELATED APPLICATIONS

This application is a national stage filing under 35 U.S.C. 371 of PCT/US2017/028525, filed Apr. 20, 2017, which claims the benefit of EP Patent Application No. 16166434.7, filed Apr. 21, 2016, the disclosures of which are incorporated by reference in their entirety herein.

The invention relates to a hydrophobic integrally asymmetrical hollow fiber membrane that is suited in particular for gas exchange, is composed primarily of a poly(4-methyl-1-pentene) and has an inner surface facing towards its lumen, an outer surface facing outwards, the membrane having between inner surface and outer surface a support layer with a sponge-like, open-pored, microporous structure and adjacent to this support layer on the outer surface a separation layer with denser structure, wherein the support layer is free of macrovoids and the pores in the support layer are on average essentially isotropic.

The invention relates further to a process for manufacturing this membrane using a thermally induced phase separation process, the membrane having a sponge-like, open-pored, microporous structure.

In a multitude of applications in the fields of chemistry, biochemistry, or medicine, the problem arises of separating gaseous components from liquids or adding such components to the liquids. For such gas exchange processes, there is increasing use of membranes that serve as a separation membrane between the respective liquid, from which a gaseous component is to be separated or to which a gaseous component is to be added, and a fluid that serves to absorb or release this gaseous component. An important application of membrane-based gas exchange processes in the medical field is for oxygenators, also called artificial lungs. In these oxygenators, which are used in open-heart operations, for example, oxygenation of blood and removal of carbon dioxide from the blood take place. Generally, bundles of hollow-fiber membranes are used for such oxygenators.

In order to provide the blood with sufficient oxygen and at the same time to remove carbon dioxide from the blood to a sufficient extent, the membranes must ensure a high degree of gas transport: a sufficient amount of oxygen must be transferred from the gas side of the membrane to the blood side and, conversely, a sufficient amount of carbon dioxide from the blood side of the membrane to the gas side, i.e., the gas flow or gas transfer rates, expressed as the gas volume transported per unit of time and membrane surface area from one membrane side to the other, must be high. A decisive influence on the transfer rates is exerted by the porosity of the membrane, since only in the case of sufficiently high porosity can adequate transfer rates be attained. Membranes for oxygenation are e.g. described in EP-A 0 299 381, U.S. Pat. No. 6,409,921 or 6,497,752.

To keep the stress level low and relax the patient, the patient has to be asleep for many medical procedures. Thus, during a surgical intervention anesthetic agents, i.e. an anesthetic gas mixture is added to the breathing air in order to sedate the patient. Since these anesthetic gases are expensive, the anesthetic gas-air mixture is circulated.

Anesthetic circuit systems wherein anesthetic agent is partially re-used after being delivered to the patient are known in the art. The benefit is that less anesthetic agent is used. This is financially beneficial due to the relatively high cost of most anesthetic agents. The use of less anesthetic agents may also be good for the environment since some anesthetic agents, such as the halogenated hydrocarbon sevoflurane, for example, are greenhouse fluids.

Carbon dioxide is formed in the cell and is released though the alveoli of the lungs during expiration at a level of around 5% of the expiratory fluid mixture. The concentration at the end of expiration is called the end tidal carbon dioxide value. The inspiratory level of carbon dioxide is normally well below 0.5%. Having excessive levels of carbon dioxide in the blood of the patient will decrease the pH value of the blood (acidosis) and will, if not treated properly, affect the patient's brain activity and may eventually lead to unconsciousness and death.

When the patient inhales the anesthetic agent in a fluid mixture, the anesthetic agent passes through the alveoli of the lungs into the patient's blood. The patient exhales a fluid mixture comprising, among other components, exhaled anesthetic, exhaled oxygen $O_2$ and exhaled carbon dioxide $CO_2$. Due to the operation of the human's lungs, the carbon dioxide content of the exhaled fluid mixture is higher than that of the inhaled fluid mixture. Furthermore, the oxygen content of the exhaled fluid mixture is lower than that of the inhaled fluid mixture. To be able to re-use the fluid mixture (containing the exhaled anesthetic fluid), the carbon dioxide of the exhaled fluid mixture must be lowered to levels suitable for re-inhalation.

Anesthetic circuits aimed at decreasing the amount of carbon dioxide fluid re-inhaled by the patient are known in the art. Some in the industry have focused on decreasing the carbon dioxide content in the exhaled mixture, along with trying to preserve exhaled oxygen and exhaled molecular anesthetic agent within the anesthetic circuit for re-inhalation. Their desire to preserve exhaled oxygen fluid is premised on the notion that oxygen needs to be provided as part of the inhaled mixture in an appropriate level to keep the oxygen saturation in the patient's blood high enough to allow for proper metabolism. Many publications focus on separating or binding the $CO_2$ specifically and therefore separate it from the fluid mixture containing the anesthetic agent.

Some conventional anesthetic circuits use carbon dioxide absorbers to reduce exhaled carbon dioxide within the anesthetic circuit. In some cases, soda lime or baralyme, for example, are used. Sevoflurane and other anesthetic vapours can react with these carbon dioxide absorbers to produce harmful chemicals such as compound A. Compound A has been found to have negative effects such as nephro and cerebo toxic effects.

In order to circumvent the problems arising from usage of absorber materials for removal of exhaled $CO_2$ an anesthetic circuit for treating a patient has been proposed which comprises a polymeric hollow fiber membrane which is at least partially impervious to the exhaled molecular anesthetic agent but is pervious to oxygen and to carbon dioxide (see WO 2012/174649; WO 2014/094139).

The hollow fiber membranes used in these anesthetic circuits may be made of a polymethylpentene and have an asymmetric structure with a porous support layer and a denser outer layer. For example a hollow fiber membrane sold under the trademark OXYPLUS® (3M Corporation) has been used, which was contained in an QuADRax-D® oxygenator (Maquet Cardiopulmonary AG).

While it was found that removal of $CO_2$ and the $O_2$ balance could be effected sufficiently with these oxygenators containing axYPLus® membranes, still some amounts of anesthetic agents passed through the membrane. On the other hand, a similar membrane was used in examples of WO 2012/174649 sold under the tradename ULTRAPHOBIC (3M Corporation) which showed good retention of anesthetic agents but for which the transfer of $CO_2$ and $O_2$ across the membrane wall was insufficient.

It is therefore an object of the present invention to provide a membrane which has improved gas permeance characteristics and which could be used in an anesthetic circuit. It is a further object of the invention to provide a process for manufacturing such membrane.

The object is met by an integrally asymmetrical hollow fiber membrane for retention of anesthetic agents, which membrane is composed primarily of a poly(4-methyl-1-pentene) and has an inner surface facing towards its lumen, an outer surface facing outwards, a support layer with a sponge-like, open-pored, microporous structure between inner surface and outer surface and adjacent to this support layer on the outer surface a separation layer with denser structure, wherein the support layer is free of macrovoids and the pores in the support layer are on average essentially isotropic, characterized in that the separation layer has a thickness in the range between 1.0 and 3.5 µm and, that the membrane has a permeance for $CO_2$ of 20-60 mol/(h·m²·bar), a gas separation factor $\alpha(CO_2/N_2)$ of at least 5 and a selectivity $CO_2$/molecular anesthetic agent of at least 150 and that the membrane has a porosity in the range of greater than 35% to less than 50% by volume.

These membranes find excellent application in anesthetic circuits for treating patients, wherein the overall structure of the membrane allows for a high $CO_2$ permeance, i.e. for a good transport of carbon dioxide over the membrane wall, and thus makes possible sufficiently high removal rates for $CO_2$ from the exhaled fluid mixture in an anesthetic circuit. On the other hand, the high selectivity $CO_2$/anesthetic agents of at least 150, which is caused by the structure of the separation layer of the membrane of the invention ensures a very high retention of anesthetic agents by the membrane, so that the anesthetic agents added into the fluid mixture inhaled by the patient nearly quantitatively remain in the anesthetic circuit. Therefore, another aspect of the present invention is the use of the integrally asymmetrical hydrophobic hollow fiber membrane of the invention in an anesthetic circuit. In a preferred embodiment the present membrane has a selectivity $CO_2$/anesthetic agent in the range of 220 to 1000. Particularly preferred is a selectivity $CO_2$/anesthetic agent in the range of 400 to 1000. The values and ranges for the selectivity $CO_2$/anesthetic agent are in particular valid for sevoflurane as anesthetic agent.

The anesthetic agent is understood to be a molecular anesthetic agent and may comprise a polyhalogenated ether. More particular, the molecular anesthetic agent may include at least one of sevoflurane, isoflurane or desflurane. The molecular anesthetic agent may preferably have a molecular weight of greater than 168 g/mol.

The present hollow fiber membrane has an asymmetric structure in that it has on one side of the membrane wall a dense separation layer covering a coarser pored support layer. Within the context of the present invention, an integrally asymmetrical membrane is understood to be one in which the separation and support layers consist of the same material and have been formed together directly during membrane production and both layers are integrally joined with each other as a result. In the transition from the separation layer to the support layer, there is merely a change with respect to the membrane structure. Contrasting with this are composite membranes, for example, which have a multilayer structure formed by applying, in a separate process step, a dense layer as a separation layer on a porous, often microporous support layer or support membrane. The result is that the materials constituting the support and separation layers also have different properties in the case of composite membranes.

Due to its structure, the present hollow fiber membrane is distinguished by high gas flow rates and high gas transfer rates or gas permeances, respectively, while maintaining high levels of safety with respect to a permeation of anesthetic agents. To achieve this, the volume porosity of the present membrane has to be adjusted in a rather narrow range between 35 and 50% by volume, whereby the volume porosity is determined substantially by the structure of the support layer. Preferably the membrane has a volume porosity in the range from 40% to 50% by volume.

On the other hand, it is necessary for the present membrane to have a defined separation layer with a dense structure which allows transport of oxygen and carbon dioxide but safely retains anesthetic gases. It has been found that in order to achieve safe retention of anesthetic agents, the separation layer needs to have a minimum thickness of 1.0 µm while for a sufficient transport of oxygen and carbon dioxide the thickness of the separation layer should not exceed 3.5 µm. Preferably, the separation layer of the present hollow fiber membrane may have a thickness between 1.0 µm and 2.0 µm and more preferably a thickness between 1.0 and 1.8 µm. In a further preferred embodiment of the present membrane, the membrane structure changes abruptly in the transition from the separation to the support layer, i.e., the membrane structure changes substantially transition-free and suddenly without gradual change from the microporous support structure to the separation layer. The thickness of the separation layer can be determined for the membranes of the invention in a simple manner by measuring the layer using fracture images generated by scanning electronic microscopy or by ultrathin-section characterizations using transmission electron microscopy.

The support layer of the membrane of the invention may have various structures. In one embodiment of the membrane of the invention, the support layer may have a sponge-like, cellular and open-pored structure, in which the pores can be described as enveloped microcells that are interconnected by channels, smaller pores, or passages. In another embodiment of the membrane of the invention, the support layer may have a non-cellular structure, in which the polymer phase and the pores form interpenetrating network structures. In any case, however, the support layer is free of macrovoids, i.e., free of such pores often referred to in the literature as finger pores or caverns.

The pores of the support layer can have any geometry and be, for example, of elongated, cylindrical, rounded shape, or also have a more or less irregular shape. In accordance with the invention, the pores in the support layer are on average substantially isotropic. This is understood to mean that, although the individual pores can also have an elongated shape, the pores on average in all spatial directions have substantially the same extension, whereby deviations of up to 20% can exist between the extensions in the individual spatial directions.

The membrane of the invention has a separation layer on its outer surface. In a preferred embodiment the membrane of the invention has on its inner surface facing the lumen an open-pored, network-like structure with approximately circular openings. Approximately circular openings are understood to be openings in which the ratio of the major axis to the minor axis does not exceed 2:1. Due to their open-pored structure, such membranes have on their one side a comparatively small resistance to gas flow, for example.

The separation layer influences the gas flow and gas transfer rates. It also influences whether and how well various gases in a gas mixture can be separated from one another, i.e., the gas separation factor $\alpha(CO_2/N_2)$, for example.

In the dense separation layer of the present membrane, the gas transfer or gas flow takes place via solution diffusion. The tightness of the separation layer and its suitability in particular for gas transfer can often not be evaluated with sufficient reliability solely on the basis of visual inspection, using a scanning electron microscope for example. In this case, not only the size of existing pores or in general structural defects such as fissures but also their number play a role. However, for membranes having a dense separation layer, the characteristics of the separation layer can only be evaluated by examining the gas permeation and gas flow through the membrane as well as the gas separation factors.

It is well known that the general principles of gas transport in polymer membranes depend on the pore size in the membrane. In membranes with a dense separation layer, the gas permeates through this membrane via solution diffusion mechanisms, i.e. gas permeation through nonporous membranes has two components: solution and diffusion. Components in the feed gas dissolve in the polymeric membrane material at a high pressure and then diffuse down their concentration gradient through the membrane to the permeate side of the membrane. Membrane selectivity is determined by combining the differences in component solubility and diffusivity.

The solution-diffusion model assumes that the pressure across the membrane is constant at the feed pressure ($p_0$), so diffusion is driven by concentration differences. The model is able to describe permeability as a function of solubility and diffusivity. Henry's Law relates the concentration of a solute in the membrane to the bulk partial pressure applied to the membrane and accounts for the discontinuity between the bulk and membrane concentration. It is therefore possible to express the flux, $J_i$, in terms of partial pressures incorporating the solubility coefficient per Equation 1:

$$J_i = \frac{D_i S_i}{l}(p_{i0} - p_{il}) \quad (1)$$

Where $S_i$ is the solubility coefficient of component i (mol m$^{-2}$ bar$^{-2}$), relating the partial pressure of the component to the concentration in the membrane phase, and $p_{i0}$ and psi are the partial pressures (bar) of component i at the feed and permeate membrane interfaces, respectively.

The permeability, $P_i$, describes the flux, $J_i$, normalized to time, area, and driving force. $P_i$ is the product of the solubility coefficient, $S_i$, and diffusion coefficient, Di, in the membrane. Since it is often difficult to define the membrane thickness in a consistent manner, especially for asymmetric membranes, where the proportional thickness of the support layer and the dense skin can vary, the permeability and membrane thickness are often lumped together into a single parameter referred to as the permeance $K_i$. The permeance can be directly calculated by normalizing the flux for the driving force, using Equation 2:

$$K_i = \frac{P_i}{l} = \frac{D_i S_i}{l} = \frac{J_i}{p_{i0} - p_{il}} \quad (2)$$

It is usually possible to assume that the component partial pressures at each membrane interface (0 and I) are equal to the average partial pressure of the feed and permeate, respectively. The membranes of this application are hollow fiber membranes with the dense layer at the outside.

During characterization, the feed is going to be on the lumen side and the permeate will be on the shell side of the module containing these fibers. In this case, the permeance can be calculated by dividing the flux $J_i$ of component i across the membrane by the average partial pressure difference of that component between the feed and the permeate side. On the shell-side, the permeate is assumed to be perfectly mixed, so its partial pressures are assumed to be equal to the measured outlet partial pressure.

In this case, the permeance can be calculated using Equation 3, where the partial pressure driving force is estimated using Equation 4:

$$K_i = \frac{J_i}{\Delta p_{i,LM}} \quad (3)$$

$$\Delta p_{i,LM} = \frac{(y_{if,in}P_f - y_{iP}P_P) - (y_{if,out}P_f - y_{iP}P_P)}{\ln(y_{if,in}P_f - y_{iP}P_P / y_{if,out}P_f - y_{iP}P_P)} = \frac{P_f(y_{if,in} - y_{if,out})}{\ln(y_{if,in}P_f - y_{iP}P_P / y_{if,out}P_f - y_{iP}P_P)} \quad (4)$$

In addition to permeability and permeance, membrane selectivity is an additional intrinsic membrane property used for characterization. Membrane selectivity ($\alpha_{ij}$) is defined as the ratio of the permeability or permeance of two components (i and j) through a membrane, per Equation 5:

$$\alpha_{ij} = \frac{K_i}{K_j} = \frac{P_i}{P_j} \quad (5)$$

Selectivity can be reported as a ratio of pure gas permeance, or when measured in a mixture of the several components, as the ratio of permeance of the gas components in the mixture.

To ensure the gas flow characteristic of the present invention and to ensure a high integrity of the separation layer, the hollow fiber membrane, therefore, preferably may have a gas separation factor $\alpha(CO_2/N_2)$ of at least 8 and more preferably of at least 10.

Despite the presence of a dense separating layer the membrane of the invention exhibits a high permeance for $O_2$ and $CO_2$. In particular the permeance with respect to $CO_2$ is an important factor in anesthetic circuits in order to remove $CO_2$ from the patient's exhaled fluid mixture. The $O_2$ and $CO_2$ permeances are thus regarded as a measure for the gas transfer capacity of the membrane, in each case with respect to the permeate side being held at atmospheric pressure. The membrane may have a permeance for $CO_2$ of 20-60 mol/(h·m$^2$·bar) and preferably of 25-40 mol/(h·m$^2$·bar). In a further preferred embodiment the membrane may have a $O_2$ permeance of at least 10 mol/(h·m$^2$·bar) and more preferably of at least 15 mol/(h·m$^2$·bar).

The hollow-fiber membrane preferably has an outside diameter between 200 and 500 µm, especially preferably between 300 and 400 µm. A wall thickness of the hollow-fiber membrane between 50 and 150 µm is advantageous, and a thickness between 50 and 100 µm is especially advantageous.

The hollow-fiber membrane according to the invention can be produced by means of a method in which the membrane formation takes place via a thermally induced phase separation process.

The object of the invention is further met by a process for producing the integrally asymmetrical hydrophobic hollow fiber membrane of the invention composed primarily of a poly(4-methyl-1-pentene) and having an inner surface facing towards its lumen, an outer surface facing outwards, the membrane having between inner surface and outer surface a support layer with a sponge-like, open-pored, microporous structure and adjacent to this support layer on the outer surface a separation layer with denser structure, wherein the support layer is free of macrovoids and the pores in the support layer are on average essentially isotropic, the process comprising at least the steps of:

a) preparing a homogeneous solution of a polymer component consisting of a poly(4-methyl-1-pentene) in a solvent system containing a component A and a component B that are liquid and miscible with each other at the dissolving temperature, whereby the employed mixture of the polymer component and components A and B has a critical demixing temperature and a solidification temperature and has a miscibility gap in the liquid state of aggregation below the critical demixing temperature, whereby a strong solvent for the polymer component is selected for component A, for which the demixing temperature of a solution of 25% by weight of the polymer component in this solvent is at least 10% below the melting point of the pure polymer component, wherein demixing temperature and melting point are measured in ° C., and component B raises the demixing temperature of a solution consisting of the polymer component and component A, wherein component B is a weak non-solvent for the polymer component, which does not dissolve the polymer component to form a homogeneous solution when heated to the boiling point of component B and for which the demixing temperature of a system consisting of 25% by weight of the polymer component, 10% by weight of the weak non-solvent, and 65% by weight of component A, used as the solvent, is at most 10% above the demixing temperature of a system consisting of 25% by weight of the polymer component and 75% by weight of component A, wherein the temperatures are measured in ° C., b) rendering the solution to form a hollow fiber, with outer and inner surfaces, in a die having a temperature above the critical demixing temperature, c) cooling of the hollow fiber using a liquid cooling medium having an entrance surface, which cooling medium does not dissolve the polymer component or react chemically with it at temperatures up to the die temperature and is tempered to a cooling temperature below the solidification temperature, wherein the cooling medium is a homogeneous, single-phase liquid at the cooling temperature and the cooling is done at such a rate that a thermodynamic non-equilibrium liquid-liquid phase separation into a high-polymer-content phase and a low-polymer content phase takes place and solidification of the high-polymer-content phase subsequently occurs when the temperature falls below the solidification temperature, d) possibly removing components A and B from the hollow fiber, characterized in that the concentration of the polymer component in the homogeneous solution is in the range from 42.5 to 45.8% by weight and the concentration of the solvent system in the range from 57.5 to 54.2% by weight and that the hollow fiber leaving the die runs through a gap between the exit surface of the die and the surface of the cooling medium before entering the cooling medium, wherein the gap has a length in the range from 5 to 30 mm.

It has been found to be essential in the process of the invention to adjust the concentration of the polymer component in the homogeneous solution in a very narrow range from 42.5 to 45.8% by weight in order to obtain a hollow fiber membrane having the required balanced properties with respect to the permeance of $O_2$ and $CO_2$ on one hand and of the anesthetic agents on the other hand. In addition, in order to obtain a separation layer having the required properties, is necessary for the hollow fiber exiting the die to travel through a gap before entering the cooling medium. In the process of the invention the gap between the die an the entrance surface of the cooling medium may have a length in the range of 5 to 30 mm. When adjusting the gap length in the required range, hollow fiber membranes with sufficiently dense separation layers are obtained while the separation layer still is sufficiently permeable for $CO_2$.

The process according to the invention is based on a thermally induced phase separation process with liquid-liquid phase separation. According to the invention, the polymer component and components A and B form a binary system, which in the liquid state of aggregation has a range in which the system is present as a homogeneous solution and a range in which it exhibits a miscibility gap. If such a system is cooled, from the range in which it is present as a homogenous solution, below the critical demixing or phase separation temperature, liquid-liquid demixing or phase separation into two liquid phases, namely one with a high polymer content and the other with a low polymer content, initially takes place. On further cooling, below the solidification temperature, the high-polymer-content phase solidifies to form a three-dimensional membrane structure. The cooling rate thereby has a substantial influence on the pore structure being created. If the cooling rate is high enough that the liquid-liquid phase separation cannot take place under thermodynamic equilibrium conditions but rather under thermodynamic non-equilibrium conditions and on the other hand still relatively slowly, the liquid-liquid phase separation occurs approximately concurrently with the formation of a large number of droplets of liquid that are of substantially the same size. The resulting polymer object then has a sponge-like cellular and open-pored microstructure. If the cooling rate is significantly higher, the polymer solidifies before most of the droplets of liquid can form. In this case, network-like microstructures are formed. The variety of such sponge-like microporous structures formed via processes with thermally induced liquid-liquid phase separation are described in detail in U.S. Pat. No. 4,519,909, to the disclosure of which reference is hereby explicitly made, and depicted for example in R. E. Kesting, "Synthetic Polymeric Membranes", John Wiley & Sons, 1985, pp. 261-264.

The employed combinations of the polymer component, component A, and component B, whereby components A and B together form the solvent system, must be convertible jointly into a single homogeneous liquid phase and have a critical demixing temperature below which a phase separation into two liquid phases occurs. This is higher, however, than the demixing temperature of a solution containing equal parts of polymer but only component A as a solvent system. In polymer/component A systems with a miscibility gap in the liquid state of aggregation, the addition of component B therefore raises the critical demixing temperature. Adding component B enables selective control of pore size and pore volume in the porous structures obtained.

For component A, components are to be used that are solvents for the polymer component and in which, when heated at most to the boiling point of this component, this polymer component is dissolved completely to form a homogeneous solution. According to the invention, a solvent must be used as component A for which the demixing temperature of a solution of 25% by weight of the polymer component in this solvent is at least 10% under the melting point of the pure component consisting of the at least one polymer, wherein demixing temperature and melting point are measured in ° C. Within the scope of the present invention, such a solvent is referred to as a strong solvent.

The demixing or phase separation temperature can be determined in a simple manner by initially preparing a homogeneous solution of the polymer component in the solvent to be investigated and then heating this solution to a temperature approximately 20° C. above the dissolving temperature. This solution is stirred and maintained at this temperature for about 0.5 hours, in order to achieve sufficient homogeneity. Subsequently, the solution is stirred and cooled at a rate of 1° C./min. The phase separation temperature is determined as the temperature at which clouding becomes visible. On further cooling, the phase with high polymer content solidifies at the solidification temperature.

For component B, according to the invention a component is selected that is a weak non-solvent for the polymer component. Non-solvent for the polymer component is understood to mean a component that does not dissolve the polymer component, in a concentration of 1% by weight in the non-solvent, to form a homogeneous solution when heated to at most the boiling point of this non-solvent. In the scope of the present invention, the strength of the non-solvent is assessed on the basis of the difference between the demixing temperature of a system consisting of the polymer component and a strong solvent and the demixing temperature of a corresponding system containing as a solvent system the same solvent and 10% by weight of the non-solvent to be investigated. The polymer concentration in each case is 25% by weight. A weak non-solvent is then understood to be one that leads to an increase in the demixing temperature of at most 8% relative to the demixing temperature of the corresponding system consisting only of solvent and polymer, wherein the temperatures are measured in ° C. A strong non-solvent is, by definition, one that leads to an at least 10% increase in the demixing temperature.

Component A can also be blended with one or more liquids, in particular other solvents. Component B can also be employed as a mixture with one or more other components, in particular additional non-solvents. As a result, within the context of the present invention, component A is understood as not only a single component but also a mixture of different solvents, for example two strong solvents or a strong with a weak solvent, as long as the overall action as a strong solvent is maintained. Likewise, component B is also understood to be a mixture of different non-solvents, for example several weak non-solvents, as long as the action as a weak non-solvent is maintained.

The fraction of polymer required for membrane production and the ratio of component A to component B in the solvent system can be determined by generating phase diagrams in simple experiments. Such phase diagrams can be developed using known methods, such as are described in C. A. Smolders, J. J. van Aartsen, A. Steenbergen, Kolloid-Z. and Z. Polymere, 243 (1971), pp. 14-20. As a rule, for a given solvent A, the fraction of component B, i.e., weak non-solvent, in the mixture of the polymer component, component A, and component B depends on the strength of the non-solvent, i.e., component B. Preferably, the fraction of component B in the solvent system is 1 to 45% by weight.

In the process according to the invention, the polymer component is a poly(4-methyl-1-pentene). It has been found that poly(4-methyl-1-pentene) has high gas permeability coefficients for $O_2$ and $CO_2$ and thus high gas transfer rates or permeances can be realized when using this polymer while maintaining good mechanical properties for the membranes.

For components A and B, which jointly form the solvent system, components are to be used that fulfill the stated conditions. For the present process, component A is preferably dioctyl adipate, isopropyl myristate, diphenyl ether, dibenzyl ether, or mixtures thereof. Glycerin triacetate, diethyl phthalate, castor oil, N,N-bis(2-hydroxyethyl)tallow amine, soybean oil, or mixtures thereof have proven advantageous as component B. Especially good results are obtained when glycerin triacetate is used as component B. In a particular preferred embodiment of the process the solvent system comprises a mixture of dioctyl adipate, glycerin triacetate and castor oil. Membranes produced from this solvent system on one hand show the required characteristics regarding gas transfer rates (permeance) and selectivity but also exhibit good mechanical properties.

The polymer fraction of the solution has to be set to the narrow range from 42.5 to 45.8% by weight, and the fraction of the solvent system, consisting of components A and B, to the range from 57.5 to 54.2% by weight. The polymer fraction is preferred to be 43-45.5% by weight and the fraction of components A and B 57-54.5% by weight. If necessary, additional substances such as antioxidants, nucleating agents, fillers and similar substances can be employed as additives to the polymer component, components A and B, or to the polymer solution.

The polymer solution formed from the polymer component and the solvent system is given shape using suitable dies to produce a hollow-fiber membrane. Conventional hollow-fiber dies can be employed.

In the present process for manufacturing the hollow-fiber membranes the polymer solution is extruded through the annular gap of the hollow-fiber die to form a hollow fiber. A fluid is metered through the central bore of the hollow-fiber die that acts as an interior filler for shaping and stabilizing the lumen of the hollow-fiber membrane. The extruded hollow fiber leaving the hollow-fiber die at the die exit surface then exhibits a surface facing the lumen, the interior surface, and a surface facing away from the lumen, the exterior surface, separated from the interior surface by the wall of the hollow fiber.

The interior filler employed can be in gaseous or liquid form. When using a liquid as the interior filler, a liquid must be selected that substantially does not dissolve the polymer component in the shaped polymer solution below the critical demixing temperature of the polymer solution. To achieve an open-pored structure on the interior surface, interior fillers are preferably used that are solvents for the at least one polymer used, whereby the previously cited condition must be observed, and/or temperatures of the interior filler are set that are in the vicinity of the polymer solution temperature. The interior filler can be miscible with the solvent system. Preferably the interior filler is gaseous; it can be air, a vaporous material, or preferably nitrogen or other inert gases.

After shaping, the hollow fiber is cooled using a liquid cooling medium, so that a thermodynamic non-equilibrium liquid-liquid phase separation occurs in the hollow fiber, i.e., in the shaped polymer solution, and the polymer structure subsequently solidifies and hardens. In this process, the liquid cooling medium has been tempered to a temperature below the solidification temperature. According to the invention, in order to produce the desired integrally asymmetrical membrane with separation layer, the cooling medium must be one that does not dissolve the polymer component and does not chemically react with it, even when the medium is heated to the die temperature. The use of such a cooling medium is decisive for the formation of a separation layer. Such a requirement placed on the cooling medium rules out, for example, the use as a cooling medium of the mixture of components A and B employed as the solvent system. Although such a system would not dissolve the polymer component at the cooling temperature, the polymer component forms a homogeneous solution at the die temperature, as previously noted.

In the process of the invention the exit surface of the die and the surface of the cooling medium are spatially separated by a gap, which is transited by the extruded hollow fiber prior to contact with the liquid cooling medium and which may have a length in the range from 5 to 30 mm. In a preferred embodiment of the present process the gap may have a length in the rage of 15 to 25 mm. As mentioned above, for of a separation layer having the required characteristics it is decisive for the extruded hollow fiber to run through a gap between exit surface of the hollow fiber die and the entrance surface of the liquid cooling medium. The gap preferably may be an air gap, which at least partially may be heated at the upper end by the hollow fiber forming die. It is believed that formation of a separation layer on the outside surface of the hollow fiber is already initiated in the gap between die and surface of the cooling medium. Only in case the hollow fiber travels through a gap having a length in the range from 5 to 30 mm and preferably in the rage of 15 to 25 mm a hollow fiber membrane is obtained after cooling having a sufficiently dense separation layer.

It is preferred for the liquid used as the cooling medium to be a non-solvent for the polymer component, i.e., it does not dissolve the polymer component to form a homogeneous solution when heated to at most the boiling point of the cooling medium. The liquid used as the cooling medium can also contain a component that is a solvent for the polymer component, or it can also be a mixture of different non-solvents, as long as it overall does not dissolve the polymer component. It is observed in this case that the degree of non-solvent character of the cooling medium influences the tightness of the separation layer being formed. In an especially preferred embodiment of the process according to the invention, therefore, a liquid is used as a cooling medium that is a strong non-solvent for the polymer component. Concerning the definitions of non-solvent and strong non-solvent, reference is made to the previous discussion in conjunction with component B. Preferably, the cooling medium at the cooling temperature is a homogeneous, single-phase liquid. This ensures production of membranes with especially homogeneous surface structures. The liquid cooling medium can be one that is miscible with the solvent system to form a homogeneous solution or one that does not dissolve the components forming the solvent system.

To initiate a thermodynamic non-equilibrium liquid-liquid phase separation, the temperature of the cooling medium must be significantly below the critical demixing temperature or phase separation temperature of the polymer solution used and furthermore below the solidification temperature in order to solidify the phase with high polymer content. In this case, the formation of the separation layer is promoted when there is as great a difference as possible between the demixing temperature and the temperature of the cooling medium. The cooling medium preferably has a temperature at least 100° C. below the phase separation temperature, and especially preferably a temperature that is at least 150° C. below the phase separation temperature. It is particularly advantageous if the temperature of the cooling medium in this case is under 50° C. In individual cases, cooling to temperatures below ambient temperature can be required. It is also possible for cooling to take place in several steps.

The liquid cooling medium is preferably in a shaft or spinning tube which the shaped object passes through for cooling purposes. The cooling medium and shaped object are generally fed in the same direction through the shaft or spinning tube. The shaped object and cooling medium can be fed at the same or different linear speeds through the spinning tube, whereby, depending on the requirement, either the shaped object or the cooling medium can have the higher linear speed. Such process variants are described in U.S. Pat. No. 4,564,488 or 4,666,607, for example.

After cooling and hardening of the polymer structure, components A and B are usually removed from the membrane structure so produced. Removal can be performed, for example, by extraction. Preferably, extraction agents are used that do not dissolve the polymer or polymers but are miscible with components A and B. Subsequent drying at elevated temperatures can be necessary to remove the extraction agent from the membrane. Suitable extraction agents are acetone, methanol, ethanol, and preferably isopropanol.

The invention will now be described in more detail with reference to the following examples and figures:

The following methods were employed to characterize the membranes obtained:

Determination of the Volume Porosity:

A sample of at least 0.5 g of the membrane to be examined is weighed in a dry state. The membrane sample is then placed for 24 hours into a liquid that wets the membrane but does not cause it to swell, such that the liquid penetrates into all pores. This can be detected visually in that the membrane sample is transformed from an opaque to a glassy, transparent state. The membrane sample is then removed from the liquid, liquid adhering to the sample removed by centrifugation at about 1800 g, and the mass of the thus pretreated wet, i.e., liquid-filled, membrane, determined.

The volume porosity in % is determined according to the following formula 6:

$$\text{Volume porosity } [\%] = 100 \cdot \frac{(m_{wet} - m_{dry})/\rho_{liq.}}{(m_{wet} - m_{dry})/\rho_{liq.} + m_{dry}/\rho_{polymer}} \quad (6)$$

where
$m_{wet}$=weight of the wet, liquid-filled membrane sample
$m_{dry}$=weight of the dry membrane sample
$\rho_{liq}$=density of the liquid used
$\rho_{polymer}$=density of the membrane polymer Determination of Permeance and Selectivity:
Gases and Gas Mixtures:

For determination of membrane permeance and selectivity the following gases and gas mixtures were employed:

A certified mixture of 5% $CO_2$ balanced in $O_2$ was used as a carrier gas in the ternary gas mixture experiments and for calibrating the mass spectrometer. A certified calibration gas mixture of He, $O_2$ and $N_2$ was also used to calibrate the mass spectrometer. The gases and gas mixtures used are listed in Table 1:

TABLE 1

| Gas | Specification | Supplier |
|---|---|---|
| $CO_2$ | USP grade, 99.5% pure, DIN: 02014459 | Praxair, Mississauga, ON, CAN |
| $O_2$ | USP grade, 99.99% pure, DIN: 02014408 | Praxair, Mississauga, ON, CAN |
| $N_2$ | | Air Liquide, Dartmouth, NS, CAN |
| 5% $CO_2$ balanced in $O_2$ | USP grade, 99.5% pure, DIN: 02014432 | Praxair, Mississauga, ON, CAN |
| He, $O_2$ and $N_2$ | SPG-3MX0021714 | Air Liquide, Dartmouth, NS, CAN |

Sevoflurane (Abbvie, North Chicago, Ill., United States), Desflurane and Isoflurane (both from Baxter Corporation, Deerfield, Ill., United States) were administered with anaesthesia vapourizers (Draeger, Lübeck, Germany). The permeation apparatus was assembled with plastic Legris ¼-inch vacuum rated PTFE fittings and ¼-inch polyethylene tubing, as well as TruWave ⅛-inch tubing and fittings for the permeate line and mass spectrometer sampling point.

Mass Spectrometer

Gas concentrations or gas compositions for determination of permeance and selectivity were measured using a mass Spectrometer. A quadrupole mass spectrometer (Omnistar Model PTM81217131, Pfeiffer Vacuum, Aßar, Germany) was used to measure the gas composition of the feed, retentate streams as well as the permeate streams for the mixed-gas tests. The mass spectrometer was controlled through Pfeiffer Vacuum's Quadera software (v4.50.004). Mass spectrometer operation, data analysis, display and storage were all controlled via Quadera. It was operated using Secondary Electron Multiplier (SEM) ion detection to achieve a higher resolution and to enable accurate detection at low concentrations. The same operating conditions were used for all of these experiments (SEM voltage of 910 V, Ion Current of $5.1^{-0.9}$ A, Spectral Resolution of 50 and a dwell of one second).

The mass spectrometer was calibrated for mass specific concentration determination per Pfeiffer Vacuum's recommended calibration procedure. An offset calibration was performed to eliminate any inherent offset of the measured SEM signal. A mass scale adjust calibration was then conducted to tune the mass scale to adjust the measured value of each mass of interest to an integer value. A background determination calibration was then performed to identify any mass peaks from residual gases that were not associated with the gases being measured. Background spectra from this calibration were subtracted from subsequent measurements. The final calibration was the gas specific calibration, where ion peaks are translated to concentration by the gas specific calibration, which entails the assignment of compounds to mass peaks. A calibration factor library was then constructed using certified calibration gas mixtures. The mass spectrometer calibration was maintained throughout the course of the experiment testing.

Anaesthesia calibration mixtures were mixed by manually injecting a defined amount of liquid Sevoflurane, Desflurane, or Isoflurane into a syringe filled with oxygen and agitating it to vapourise the liquid. The composition was calculated using the compound properties and the ideal gas law. The mixture was then used to calibrate the mass spectrometer. The concentrations supplied by the vaporizers were then verified with the calibrated device.

Determination of Permeation Characteristics:

Permeation characteristics of the membranes in the modules were measured using a variation of the constant-pressure variable-volume method.

Figure 1:
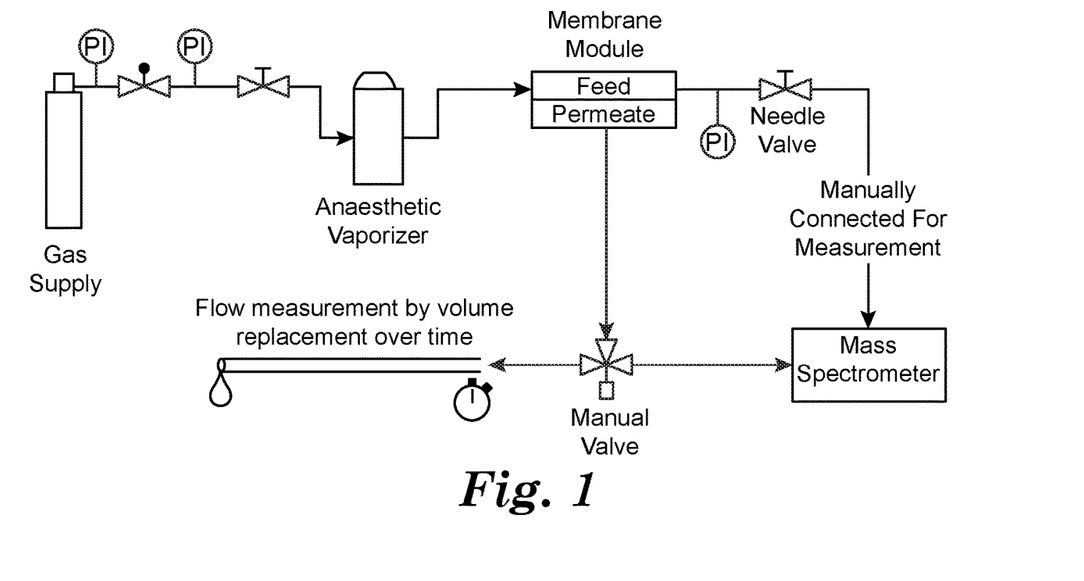
FIG. 1 shows a schematic of the experimental system.

FIG. 1 shows a schematic of the experimental system.

The feed gas flow rate was controlled using a needle valve and flow was measured using a glass tube flow meter (Scott Specialty Gases, Plumsteadville, Pa., USA) and the feed pressure using an analogue pressure gauge (Speidel Keller, Jungingen, Germany, accuracy: ±5 mmHg or ~6.67 mbar) connected to the lumen outlet stream. The feed pressure on the lumen side was held constant at 1.2 bar for each experiment. The permeate pressure on the shell side was atmospheric. One port of the shell side of the module was plugged and the other port was fed through a 3-way valve either to a modified, horizontally placed glass pipette (Fischer Scientific, 5 mL total volume) for flow measurements or to the mass spectrometer for concentration determination.

To calculate the mean flow rate, the pipette was filled with water prior to each trial and time measurements were taken at 0.5 mL intervals as the permeated gas displaced the water. Immediately following the volumetric flow rate measurement, the permeate was then fed to the mass spectrometer sampling port and the gas composition only for the mixed gas experiments. Feed gas concentrations were measured when both shell-side ports on the module were plugged. The gas composition was measured from the retentate port of the module. The system was purged with oxygen between each trial.

Pure Gas Permeation Measurements

The pure gas permeance of the membranes was determined for pure carbon dioxide ($CO_2$), oxygen ($O_2$), and nitrogen ($N_2$) supplied at 1.2 bar. Once the concentration of the gases stabilized, the permeate line was connected to the pipette setup. Four time readings were then measured every 0.5 mL as the permeate displaced the water. These readings were averaged and counted for one trial. A minimum of three trials were performed for each module at each set of operating conditions. A minimum of three trials were performed for each module at each set of operating conditions. The pure gas permeance was calculated according to Equation 7:

$$K_i^P = \frac{Q}{A(p_f - p_p)} \quad (7)$$

Where Q is the permeate molar flow rate (mol/h), $p_f$ is the absolute pressure of the feed (bar), $p_p$ is the absolute pressure of the permeate (bar), and A is the inside active membrane area (m²). Permeance is reported in units of mol/h/m²/bar. The pure gas selectivity ($\alpha_{ij}^P$) was calculated based on the ratio of the mean permeance of two pure gases i and j per Equation 8:

$$\alpha_{ij}^P = \frac{K_i^P}{K_j^P} \quad (8)$$

Where $K_i^P$ and $K_j^P$ are the pure gas permeances for components i and j, respectively.

Mixed Gas Permeation Measurements

The mixed gas permeation procedure was similar to that of the pure gas system but also required concentration measurements of the permeate. The feed and retentate compositions were determined as described above. In addition, following the flow measurements, the permeate was directed to the mass spectrometer for determination of the permeate composition.

Anaesthetic vapour concentrations for the experiments were chosen around their Minimum Alveolar Concentration (MAC). The MAC is a measure of potency of the anaesthesia gas and is defined as the minimum concentration of vapour required to immobilize 50% of patients. The MAC for Sevoflurane, Desflurane and Isoflurane is defined as 2.13%, 6.0% and 1.13% respectively. The vapour experiments were conducted with vapour concentrations at the MAC for each vapour. This set of experiments was performed near clinically relevant operating conditions, at room temperature and low feed pressure (1.2 bar) with either Sevoflurane, Isoflurane or Desflurane at their MAC mixed into a 5% carbon dioxide/oxygen gas mixture to mimic exhalation during anaesthesia administration. Three modules of each membrane type were used and three runs of each module were performed for a total of n=9 trials for Sevoflurane, Isoflurane and Desflurane.

The mixed gas tests entailed monitoring the feed, retentate and permeate gas composition with the mass spectrometer, in addition to the flow rate. The permeances of the mixed gas components were calculated using Equation 9:

$$K_i^M = \frac{y_p Q}{A \Delta p_{i,ave}} \quad (9)$$

The log-mean driving force (Equation 4) was used to compute $\Delta P_{i,ave}$. The mixed gas selectivity, alpha$^M$, was calculated using the permeance of two components i and j in a gas mixture per Equation 10:

$$\alpha_{ij}^M = \frac{K_i^M}{K_j^M} \quad (10)$$

Examples 1 to 3 and Comparative Examples 1a, 1 b, 2 and 3

In the Examples 1 to 3 and the Comparative Examples 1a, 1 b, 2 and 3, the membranes were manufactured according to the following procedure:

Poly(4-methyl-1-pentene) (TPX DX845) as polymer component was dissolved in a nitrogen atmosphere in a container with stirrer at a temperature of 260° C. in a solvent system consisting of 70% by weight dioctyl adipate, 20% by weight glycerin triacetate, and 10% by weight castor oil. The concentrations of polymer and solvent system used in Examples 1 to 3 and in Comparative Examples 1a, 1b, 2 and 3 are listed in Table 1.

After degassing, the resulting clear and homogeneous solution was fed with a gear pump to a hollow-fiber die with an annular-gap outside diameter of 1.2 mm, which had been heated to 248° C., and extruded to form a hollow fiber. Nitrogen was metered into the lumen of the hollow fiber through the interior bore of the hollow-fiber die. After an air section of 24 mm, the hollow fiber passed through an approx. 1 m long spinning tube, through which glycerin triacetate, tempered to ambient temperature, flowed as a cooling medium. The hollow fiber, solidified as a result of the cooling process in the spinning tube, was drawn off from the spinning tube at a rate of 72 m/min, wound onto a spool, subsequently extracted with isopropanol, and then dried at approx. 120° C.

Hollow-fiber membranes were obtained with an inner diameter of about 200 μm and a wall thickness of about 90 μm, for which no pores were observable on its exterior surface in a scanning-electron-microscopic (SEM) image even at 60000× magnification. The interior surface facing the lumen had an open-pored, network-like structure with approximately circular openings. The sponge-like, open-pored, microporous support structure is covered by an approx. 1.5-2.0 μm thick separation layer.

TABLE 1

| Membrane | | Comp. Ex. 1a | Comp. Ex. 1b | Exampl. 1 | Exampl. 2 | Exampl. 3 | Comp. Ex. 2 | Comp. Ex. 3 |
|---|---|---|---|---|---|---|---|---|
| Polymer concentr. | (wt. %) | 46.0 | 46.0 | 45.8 | 45.5 | 45.0 | 42.5 | 41.0 |
| Solvent system concentr. | (wt. %) | 54.0 | 54.0 | 54.2 | 54.5 | 55.0 | 57.5 | 59.0 |
| Solvent system/polymer ratio | | 1.17 | 1.17 | 1.18 | 1.20 | 1.22 | 1.35 | 1.44 |
| Fiber wall thickness | (μm) | 90 | 90 | 90 | 90 | 90 | 90 | 90 |
| Fiber internal diameter | (μm) | 200 | 200 | 200 | 200 | 200 | 200 | 200 |
| Active inside area module | (cm$^2$) | 24 | 26 | 26 | 26 | 26 | 26 | 26 |
| Active outside area module | (cm$^2$) | 45 | 49 | 49 | 49 | 49 | 49 | 49 |
| Module filling degree | % | 20.00 | 20.06 | 20.06 | 20.06 | 20.06 | 20.06 | 20.06 |

With the membranes of each example and comparative example test modules were prepared for testing the properties of the membranes. For this purpose, a minimum of three modules of each membrane type was produced by arranging the hollow fiber membranes in a cylindrical housing and potting the ends of the hollow fiber membranes in tube shells made from polyurethane. The lumina of the hollow fiber membranes were in fluid connection with a feed inlet and a feed outlet, respectively. The space in the module surrounding the hollow fiber membranes was in fluid connection with a permeate outlet.

Details of the membrane modules are listed in Table 2.

For the membranes of each example and comparative example the permeance for $CO_2$, $O_2$, and $N_2$, the gas separation factor $\alpha(CO_2/N_2)$ and the selectivity $CO_2$/anesthetic agents was measured according to the test methods described above.

Figure 2:
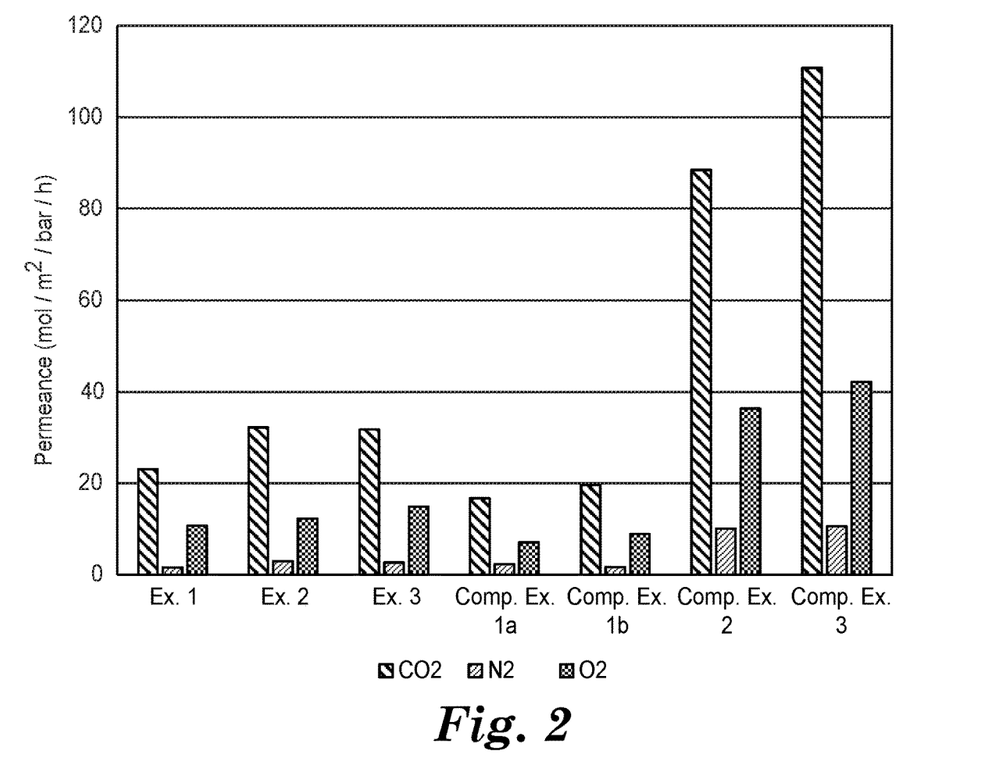
FIG. 2 graphs the Permeance results listed in Table 3.

The pure gas permeances for carbon dioxide ($CO_2$), oxygen ($O_2$) and nitrogen ($N_2$) are listed in Table 3 and are shown in FIG. 2. The property of most interest for the intended application is the carbon dioxide permeance. In addition, the permeabilities of the three gases are presented in Table 2 for the examples and the comparative examples, wherein the permeabilities are calculated on the basis of the respective permeances by multiplying the permeances by the membrane thickness (fiber wall thickness=90 μm).

TABLE 3

| | $K_i$ (mol/m²/bar/h) | | | $P_{ip}$ (10³ mol cm/m²/bar/h) | | | Selectivity $\alpha_{ij}$ | | |
|---|---|---|---|---|---|---|---|---|---|
| | $CO_2$ | $N_2$ | $O_2$ | $CO_2$ | $N_2$ | $O_2$ | $CO_2/O_2$ | $O_2/N_2$ | $CO_2/N_2$ |
| Example 1 | 23.1 | 1.6 | 10.7 | 208 | 14 | 96 | 2.2 | 6.9 | 15.0 |
| Example 2 | 32.3 | 3.0 | 12.3 | 291 | 27 | 111 | 2.6 | 4.2 | 10.9 |
| Example 3 | 31.8 | 2.7 | 14.9 | 286 | 24 | 134 | 2.1 | 5.7 | 12.1 |
| Comp. Ex. 1a | 16.7 | 2.3 | 7.1 | 150 | 21 | 64 | 2.3 | 3.1 | 7.2 |
| Comp. Ex. 1b | 19.8 | 1.7 | 7.8 | 178 | 15 | 71 | 2.5 | 4.6 | 11.5 |
| Comp. Ex. 2 | 88.6 | 10.1 | 36.4 | 797 | 91 | 328 | 2.4 | 3.6 | 8.8 |
| Comp. Ex. 3 | 110.9 | 10.6 | 42.2 | 998 | 95 | 380 | 2.6 | 4.0 | 10.5 |

Figure 3:
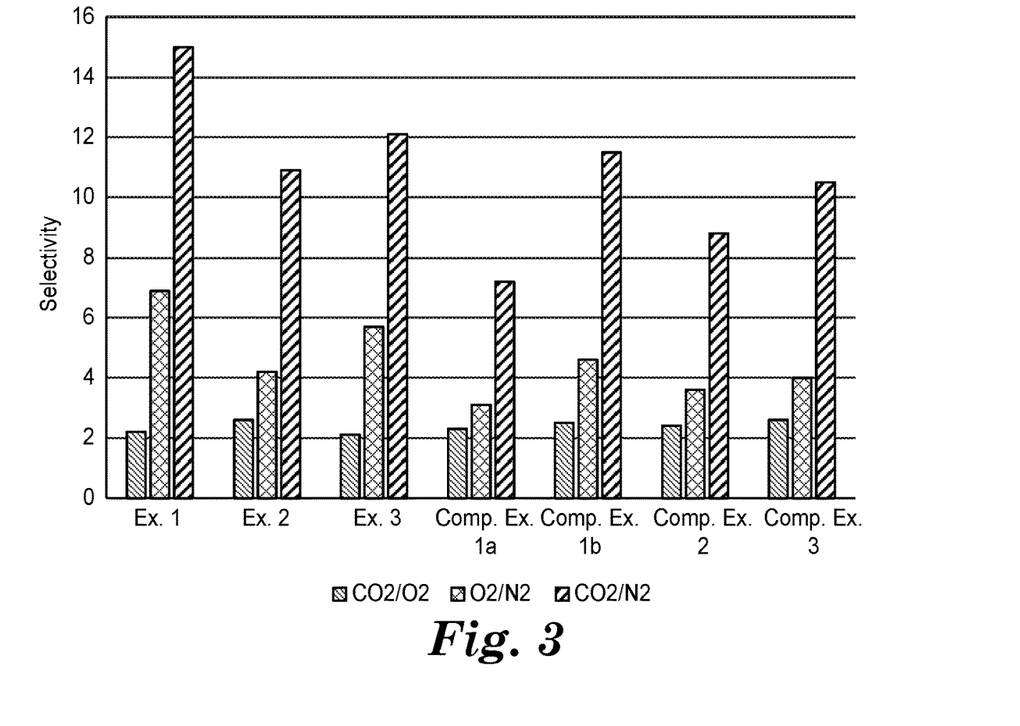
FIG. 3 graphs the Selectivity results listed in Table 4.

For the membranes of each example and comparative example mixed gas experiments were performed, i.e. experiments with gas mixtures containing either Sevoflurane (2.0 Vol.-%), Isoflurane (6.13 Vol. %), or Desflurane (1.13 Vol. %) with a balance of 5 Vol. % $CO_2$ in $O_2$ and the $CO_2$ permeance, $K_{CO2}$ (in (mol/m²/bar/h)), in these mixtures was compared to the permeance $K_{CO2}$ of pure $CO_2$ as determined in the pure gas experiments (see above). The results obtained are listed in Table 4 and shown in FIG. 3.

TABLE 4

| | $K_{CO2}$ (Pure $CO_2$) | $K_{CO2}$ ($CO_2/O_2$/Sevo) | $K_{CO2}$ ($CO_2/O_2$/Iso) | $K_{CO2}$ ($CO_2/O_2$/Des) |
|---|---|---|---|---|
| Example 1 | 23.1 | 15.8 | — | — |
| Example 2 | 32.3 | 33.1 | 11.4 | 25.2 |
| Example 3 | 31.8 | 23.9 | 10 | 40.5 |
| Comp. Example 1a | 16.7 | 10.4 | 5.3 | 10.1 |
| Comp. Example 1b | 19.8 | 18.4 | 7.6 | 16.6 |
| Comp. Example 2 | 88.6 | 63.3 | — | — |
| Comp. Example 3 | 110.9 | 86 | — | — |

Figure 4:
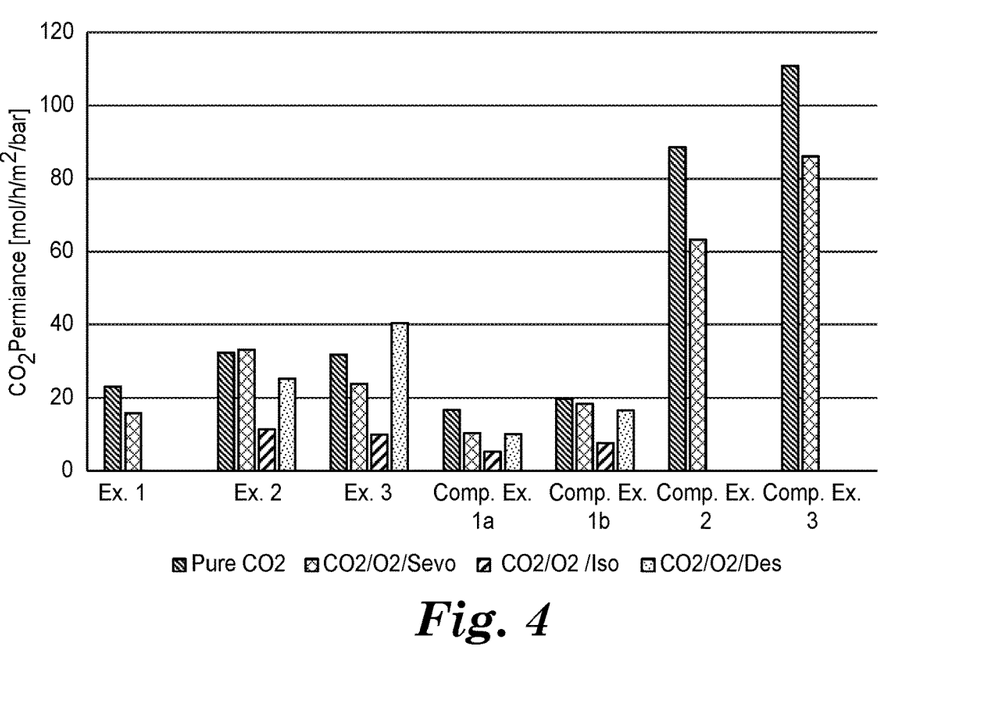
FIG. 4 graphs the CO2 Permeance.

In Table 5 the selectivity of $CO_2$ over Servoflurane as obtained from the mixed gas experiments is listed together with the pure $CO_2$ permeance for hollow fiber membranes of Examples 1 to 3 and Comparative Examples 1 to 3. Sufficiently high selectivities $CO_2$/Servoflurane resulting in a good retention of anesthetic gases by the membranes with at the same time sufficiently high permeances for $CO_2$ are obtained for the membranes of Examples 1 to 3. FIG. 4 shows a diagram of the selectivity CO2/Servoflurane in dependency of the pure $CO_2$ permeance.

TABLE 5

| | Solvent system/ polymer ratio | Pure $CO_2$ Permeance (mol/m²/bar/h) | Selectivity $\alpha_{ij}$ $CO_2$/Sevoflurane |
|---|---|---|---|
| Example 1 | 1.18 | 23.1 | 1130 |
| Example 2 | 1.20 | 32.3 | 550 |
| Example 3 | 1.22 | 31.8 | 250 |
| Comp. Example 1a | 1.17 | 16.7 | 1450 |
| Comp. Example 2 | 1.35 | 88.6 | 86 |
| Comp. Example 3 | 1.44 | 110.9 | 93 |

Figure 5:
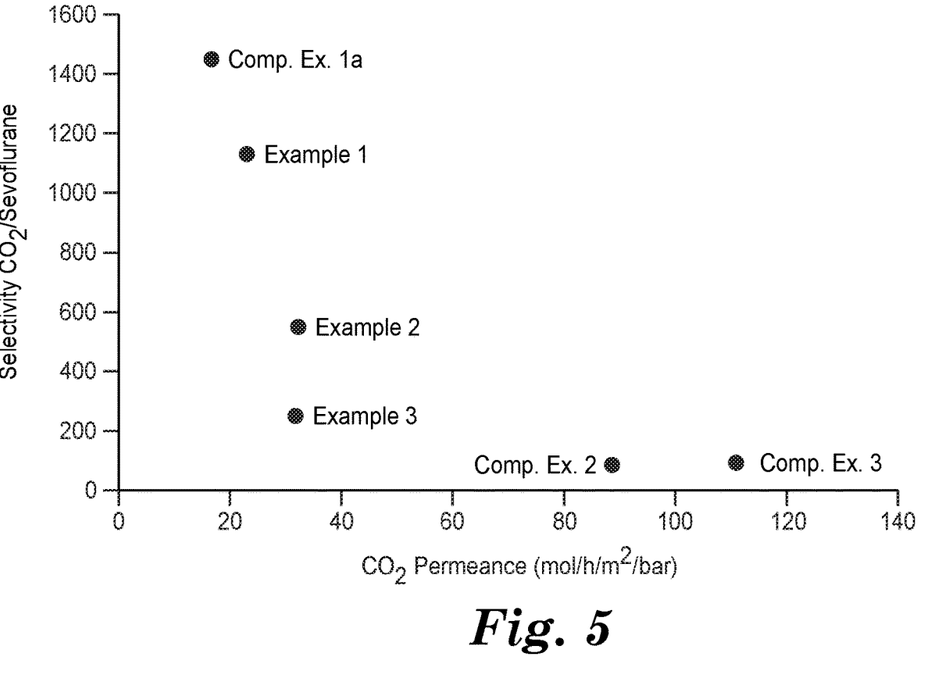
FIG. 5 graphs the Selectivity results listed in Table 5.

FIG. 5 plots the $CO_2$/Sevoflurane selectivity as a function of the $CO_2$ permeance for the Examples and Comparative Examples listed in Table 5.

This patent application filing claims priority to European patent application number EP 16166434.7 filed on Apr. 21, 2016, the specification having numbered pages 1-45 and FIGS. 1-10 on drawing sheets 1-6, the disclosure of which is herein incorporated by reference in its entirety.

The invention claimed is:

1. A process for producing a membrane comprising an integrally asymmetrical hydrophobic hollow fiber membrane for retention of anesthetic agents, which membrane is composed primarily of a poly(4-methyl-1-pentene) and has an inner surface facing towards its lumen, an outer surface facing outwards, a support layer with a sponge-like, open-pored, microporous structure between inner surface and outer surface and adjacent to this support layer on the outer surface a separation layer with denser structure, wherein the support layer is free of macrovoids and the pores in the support layer are on average essentially isotropic, wherein
the separation layer has a thickness in the range between 1.0 and 3.5 μm and,
the membrane has a permeance for CO2 of 20-60 mol/(h·m²·bar), a gas separation factor α(CO2/N2) of at least 5 and a selectivity CO2/Sevoflurane of at least 150 and the membrane has a porosity in the range of greater than 35% to less than 50% by volume, the process comprising at least the steps of:
a) preparing a homogeneous solution of a polymer component consisting of a poly(4-methyl-1-pentene) in a solvent system containing a component A, comprising dioctyl adipate, and a component B, comprising glycerin triacetate and castor oil, that are liquid and miscible with each other at the dissolving temperature, whereby the employed mixture of the polymer component and components A and B has a critical demixing temperature and a solidification temperature and has a miscibility gap in the liquid state of aggregation below the critical demixing temperature, whereby a strong solvent for the polymer component is selected for component A, for which the demixing temperature of a solution of 25% by weight of the polymer component in this solvent is at least 10% below the melting point of the pure polymer component, wherein demixing temperature and melting point are measured in ° C., and component B raises the demixing temperature of a solution consisting of the polymer component and component A, wherein component B is a weak non-solvent for the polymer component, which does not dissolve the polymer component to form a homogeneous solution when heated to the boiling point of component B and for which the demixing temperature of a system consisting of 25% by weight of the polymer component, 10% by weight of the weak non-solvent, and 65% by weight of component A, used as the solvent, is at most 10% above the demixing temperature of a system consisting of 25% by weight of the polymer component and 75% by weight of component A, wherein the temperatures are measured in ° C., b) rendering the solution to form a hollow fiber, with outer and inner surfaces, in a die having an exit surface and a die temperature above the critical demixing temperature, c) cooling of the hollow fiber using a liquid cooling medium having an entrance surface, which cooling medium does not dissolve the polymer component or react chemically with it at temperatures up to the die temperature and is tempered to a cooling temperature below the solidification temperature, wherein the cooling medium is a homogeneous, single-phase liquid at the cooling temperature and the cooling is done at such a rate that a thermodynamic non-equilibrium liquid-liquid phase separation into a high-polymer-content phase and a low-polymer content phase takes place and solidification of the high-polymer-content phase subsequently occurs when the temperature falls below the solidification temperature, d) possibly removing components A and B from the hollow fiber, wherein the concentration of the polymer component in the homogeneous solution is in the range from 42.5 to 45.8% by weight and the concentration of the solvent system in the range from 57.5 to 54.2% by weight and that the hollow fiber leaving the die runs through a gap between the exit surface of the die and the surface of the cooling medium before entering the cooling medium, wherein the gap has a length in the range of 5-30 mm.

2. The process according to claim 1, wherein the cooling medium is a liquid that is a strong non-solvent for the polymer component, for which the demixing temperature of a system consisting of 25% by weight of the polymer component, 10% by weight of the strong non-solvent, and 65% by weight of component A, used as a solvent, is at least 10% higher than the demixing temperature of a system consisting of 25% by weight of the polymer component and 75% by weight of component A.

3. The process according to claim 1, wherein the concentration of the polymer component in the homogeneous solution is in the range of 43-45.5% by weight and the concentration of the solvent system in the range of 57-54.5% by weight.

4. The process according to claim 1 wherein a solvent system/polymer ratio is from 1.18 to 1.22.

* * * * *

UNITED STATES PATENT AND TRADEMARK OFFICE
CERTIFICATE OF CORRECTION

Page 1 of 2

PATENT NO. : 10,926,214 B2
APPLICATION NO. : 16/094833
DATED : February 23, 2021
INVENTOR(S) : Ina Voigt It is certified that error appears in the above-identified patent and that said Letters Patent is hereby corrected as shown below:

On the Title Page

Page 2, item [57]
Line 6, after "component B" insert -- is --.

In the Drawings

Sheet 2 of 3, under (Fig. 4) on the (Y axis)
Delete "CO₂Permiance" and insert -- $CO_2$ Permeance --, therefor.

In the Specification

Column 1
Line 8, after "of" insert -- International Application No. --.
Line 12, below "by reference in their entirety herein." insert -- DESCRIPTION --.

Column 2
Line 48, delete "cerebo" and insert -- cerebro --, therefor.
Line 61, delete "QuADRax-D®" and insert -- QUADROX-D® --, therefor.
Line 65, delete "axYPLus®" and insert -- OXYPLUS® --, therefor.

Column 5
Line 48, delete "psi" and insert -- $p_{il}$ --, therefor.
Line 53, delete "Di," and insert -- $D_i$, --, therefor.

Column 6
Line 2, delete "I)" and insert -- l) --, therefor.

Column 8
Line 15, delete "an" and insert -- and --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*

Column 13
Line 37, delete "Aßar," and insert -- Aßlar, --, therefor.

Column 15
Line 66, delete "1 b," and insert -- 1b, --, therefor.

Columns 15-16
Line 37, delete "TABLE 1" and insert -- TABLE 2 --, therefor.

Column 17
Line 48, delete "Servoflurane" and insert -- Sevoflurane --, therefor.
Line 52, delete "CO$_2$/Servoflurane" and insert -- CO$_2$/Sevoflurane --, therefor.
Line 56, delete "CO2/Servoflurane" and insert -- CO$_2$/Sevoflurane --, therefor.